United States Patent
Wang et al.

(10) Patent No.: US 9,320,262 B2
(45) Date of Patent: Apr. 26, 2016

(54) ARTIFICIAL PET CHEWING LEATHER, MANUFACTURING METHOD AND APPLICATION THEREOF

(75) Inventors: Chuanhao Wang, Jiangsu (CN); Shangwu Liu, Jiangsu (CN)

(73) Assignee: Shangwu Liu, Huai'an, Jiangsu (CN)

( * ) Notice: Subject to any disclaimer, the term of this patent is extended or adjusted under 35 U.S.C. 154(b) by 324 days.

(21) Appl. No.: 14/002,227

(22) PCT Filed: Mar. 16, 2011

(86) PCT No.: PCT/CN2011/000433
§ 371 (c)(1),
(2), (4) Date: Aug. 29, 2013

(87) PCT Pub. No.: WO2012/116472
PCT Pub. Date: Sep. 7, 2012

(65) Prior Publication Data
US 2013/0333630 A1 Dec. 19, 2013

(30) Foreign Application Priority Data

Mar. 1, 2011 (CN) .......................... 2011 1 0048683

(51) Int. Cl.
*A01K 15/02* (2006.01)
*A23K 1/10* (2006.01)
*A01K 11/00* (2006.01)
*A23K 1/00* (2006.01)
*A23K 1/18* (2006.01)

(52) U.S. Cl.
CPC ............... *A01K 15/026* (2013.01); *A23K 1/003* (2013.01); *A23K 1/106* (2013.01); *A23K 1/1853* (2013.01)

(58) Field of Classification Search
CPC ..... C08L 89/06; A01K 15/025; A01K 15/026
USPC .................. 119/709, 710, 711, 174
See application file for complete search history.

(56) References Cited

U.S. PATENT DOCUMENTS

| | | | | |
|---|---|---|---|---|
| 2,158,265 A | * | 5/1939 | Wilson | C08L 89/06 162/151 |
| 4,325,236 A | * | 4/1982 | Tsui | C14B 7/00 69/21 |
| 4,834,762 A | * | 5/1989 | Nishibori | C08J 3/12 524/10 |
| 5,022,345 A | * | 6/1991 | Bolivar | A01K 31/12 119/531 |
| 5,074,249 A | * | 12/1991 | McMahon | A01K 15/025 119/709 |
| 5,134,031 A | * | 7/1992 | Kagechi | D01F 1/10 428/373 |
| 5,143,772 A | * | 9/1992 | Iwasa | B29C 47/0023 264/45.9 |
| 5,153,067 A | * | 10/1992 | Yoshida | C08L 89/06 428/402 |
| 5,274,078 A | * | 12/1993 | Wada | C08H 1/06 530/356 |
| 5,302,636 A | * | 4/1994 | Takino | B60C 11/14 524/11 |
| 5,306,435 A | * | 4/1994 | Ishikawa | C14C 9/00 252/8.57 |
| 5,852,079 A | * | 12/1998 | Loreth | B60C 1/0016 524/35 |
| 8,153,176 B2 | * | 4/2012 | Etayo Garralda | C08L 89/06 426/104 |
| 2006/0225664 A1 | * | 10/2006 | Zych | A01K 15/025 119/537 |

* cited by examiner

*Primary Examiner* — Yvonne Abbott-Lewis

(57) ABSTRACT

An artificial pet chewing leather, manufacturing method and application thereof are disclosed. Raw materials for the artificial pet chewing leather includes water and leather powder obtained by grinding leather, or leather pulp obtained by grinding leather in damp condition with water, or the leather powder and the leather pulp. A method for manufacturing the artificial pet chewing leather includes mixing the raw material and molding, wherein the molding refers to extrusion molding by extruder, molding by biscuit machine, press molding by mould or molding by hand craft. The artificial pet chewing leather is used for pet food. The artificial pet chew of the present invention overcomes shortcomings of the prior art. The raw material is abundantly available and easily obtained. The manufacturing method is easy and cost thereof is low. Furthermore, the pet chew products satisfy tastes of pet dogs and are easy to popularize.

10 Claims, No Drawings

ARTIFICIAL PET CHEWING LEATHER, MANUFACTURING METHOD AND APPLICATION THEREOF

CROSS REFERENCE TO RELATED APPLICATION

This is a U.S. National Stage under 35 U.S.C 371 of the International Application PCT/CN2011/000433, filed Mar. 16, 2011, which claims priority under 35 U.S.C. 119(a-d) to CN 201110048683.4, filed Mar. 1, 2011.

BACKGROUND OF THE PRESENT INVENTION

1. Field of Invention

The present invention relates to a technique for pet food, and more particularly to an artificial pet chewing leather, manufacturing method and application thereof.

2. Description of Related Arts

Dog chew, chew for short, is a high-protein pet food for pet dogs. In recent years, chew is more and more popular in pet owners. Long-term consumption of chew for pet dogs can achieve following advantages of: strengthening teeth, cleaning mouth and slowing down formation of dental plaque and tartar, stimulating generation of saliva by chewing pet chews, which is capable of neutralizing eburicoic acid, keeping cleanness of pet mouth, decreasing sufferings of gum in teething stage, protecting goods at home from being damaged and serving as toys of pet dogs, and helping to lose weight.

Main component of the conventional pet chews is the second split leather of animals such as cows or pigs. Pet chew made of cow leather or pig leather are various shapes, such as bone shape, ball shape, ring shape, stick shape, shoes shape and particle shape. Leather of animals such as cow and pig is rich in protein, and has advantages of high toughness, high flexibility and strong abrasive resistance, which satisfy biting nature of pet dogs. However, sheet of the conventional cow leather pet chew or pig leather pet chew has various sizes and thickness, various colors, has holes and large amount of leftover bits and pieces, and utilization rate of raw materials thereof is only 30~70%. Furthermore, since main component of the conventional cow leather pet chew or pig leather pet chew is protein (raw material for production of edible gelatin) which is lack of tastes and smells, and thus is difficult to attract the pet dogs. Therefore, with no other choices or being forced, a lot of pet dogs chew the conventional pet chew for a while and stops, which causes a waste pet chew. In order to overcome the problem mentioned above, some pet food manufactures add flavor additives to cow leather and pig leather, which is still not capable of attracting pet dogs for eating. Some pet food manufactures directly add meat into pet chew to produce pet chew with meat, which is capable of attracting pet dogs, but the cost thereof is 2~3 times higher than conventional cow leather pet chew or pig leather pet chew, and thus the pet chew with meat is hard to popularize.

SUMMARY OF THE PRESENT INVENTION

In order to overcome shortcoming in the prior art, the present invention provides an artificial pet chewing leather, which achieves that raw material is easily obtained, products thereof have good shape, good taste and safety, so as to attract pet dogs to eat initiatively.

An artificial pet chewing leather, wherein raw material thereof comprises:

water and leather powder obtained by grinding leather, or leather pulp obtained by grinding leather in damp condition with water, or the leather powder obtained by grinding leather and the leather pulp obtained by grinding leather in damp condition with water (with water content of 50~85%).

Furthermore, manufacturing method of the leather powder comprises steps of:

washing and denaturalizing the leather to a pH of neutrality, drying, grinding to a coin size, and grinding into wadding and powder shapes, wherein the wadding and powder shapes contains 1~10% of powder by weight.

Manufacturing method of the leather pulp comprises steps of:

washing and denaturalizing the leather to a pH of neutrality, and grinding into leather pulp, wherein solid particles of the leather pulp has a size of 0.1~3.5 mm.

The leather is selected from the group consisting of whole leather, full-grain leather, second split leather, third split leather and leftover bits and pieces of livestock skin which is processed with hair removal and pending for tanning. No pet chew is reported manufactured utilizing the third split leather and the leftover bits and pieces and by the method mentioned above. The cost of artificial pet chew manufactured by the third split leather and the leftover bits and pieces is one half or one third thereof utilizing the second split leather, and utilization rate thereof reaches 100%.

Furthermore, mass ratio of the leather powder and the leather pulp is 3~8:2~7. After the leather powder and the leather pulp are mixed, both filiform tension and viscosity thereof satisfy requirements for manufacturing pet chew.

Furthermore, the raw material further comprises one or more members selected from the group consisting of livestock bone powder, livestock meat powder, livestock meat paste, starch, protein powder, glycerol, flavoring agents, edible pigment and trace elements. An additive amount of the glycerol is 1~10% of a total weight of the pet chew, and preferably 3~5%. The glycerol added thereof has effects of preserving moisture and softening. An additive amount of the flavoring agents is 0.5-3.5% of the total weight of the pet chew, and preferably 1~1.5%. The flavoring agents comprise salt, sugar, monosodium glutamate and meat flavor such as chicken flavor, beef flavor and pork flavor. An additive amount of the livestock meat powder or the livestock meat paste is 5~95% of the total weight of the pet chew, and preferably 40~55%. An additive amount of the starch is 5~40% of a total weight of the pet chew, and preferably 8~15%. A mass ratio of the leather powder and the livestock bone powder is 2~9:1~8, and preferably 6:4.

Furthermore, the livestock bone powder is produced by drying, smoking and grinding livestock bone frame. The livestock bone frame is soaked in boiled water for 1~10 mins before drying. The livestock bone frame is dried until 20~35% water content, then smoked before grinding, wherein smoking has a good effect when the livestock bone frame has water content of 20-35%. The process of smoking is not only capable of dying the livestock bone frame, but also adding a smoky flavor to attract pet dogs. The livestock bone frame is remaining bones of livestock after slaughtering.

Another object of the present invention is to provide a manufacturing method of the artificial pet chewing leather, which achieves advantages of easy operating, low manufacturing cost and high utilization of raw material.

The method for manufacturing the artificial pet chewing leather comprises following steps of: mixing the raw materials mentioned above, forming under a temperature of 30~75° C., preferably 45~55° C., wherein the forming is extrusion molding by extruder, molding by biscuit machine or press molding by mould. After forming, the pet chew is smooth, and has uniform shapes (a common thickness thereof is 0.7~3.5 mm), no holes, and good surface fineness. Physical and chemical properties thereof (hardness, chewiness, flexibility and etc.) are basically the same with conventional cow-leather chew and pig-leather chew, and thus the artificial pet chewing leather of the present invention can completely replace the conventional cow-leather chew and pig-leather chew.

The present invention further provides applications of the artificial pet chewing leather. The artificial pet chewing leather of the present invention can be widely utilized in pet diets. By simply processing the artificial pet chewing leather of the present invention, new products of pet chew with various shapes and sizes are obtained.

A stuffed pet chew, comprises a stuffing and an external layer covered thereon, wherein the stuffing is the artificial pet chewing leather, the external layer is cow-leather chew or pig-leather chew.

A multilayer pet chew, comprises a cow-leather chew or pig-leather chew, and at least one layer of the artificial pet chewing leather covered thereon.

An embedded pet chew, comprises a main body and an edible inlay embedded therein, wherein the main body is the artificial pet chewing leather.

The raw materials of the present invention are easily obtained, formula is reasonable and manufacturing method thereof is easy operating. Compared with the prior art, the artificial pet chew of the present invention has advantages in main aspects as follows.

(1) The raw materials are easily obtained, and are abundantly available. The raw materials obtained by the present invention are leftover bits and pieces generated by leather processing and livestock bone after slaughtering, which not only achieves environmental protection but also decreases manufacturing cost thereof.

(2) The manufacturing method of the present invention is easy operating and has a low cost. During manufacturing processes, almost no loss of raw materials exists, which further decreases costs of production.

(3) Combinations of livestock bone powder, livestock meat powder, livestock meat paste and livestock leather overcome shortcomings that the conventional cow leather pet chew and pig leather pet chew have a light flavor, high waste; the pet chew with meat has a high cost, and eating bones alone is easy to stabbing and wounding animals. The artificial dog chew of the present invention satisfies tastes of pet dog and is easy to popularize.

(4) Shapes and colors of products of the artificial dog chew is controllable, and the products of the artificial dog chew can be further processed into various end products.

(5) The artificial dog chew of the present invention has a wide range of application, and is not only suitable for pet dog, but also for other animals preferring bones of animals.

(6) The artificial pet chew of the present invention solves problems that the conventional pet chew layer is not capable of being overlapped and that edible inlay is embedded thereinto.

DETAILED DESCRIPTION OF THE PREFERRED EMBODIMENT

These and other objectives, features, and advantages of the present invention will become apparent from the following detailed description, the accompanying drawings, and the appended claims.

One skilled in the art will understand that the embodiment of the present invention as shown in the drawings and described above is exemplary only and not intended to be limiting.

An artificial pet chew, wherein raw material thereof comprises:

water and leather powder obtained by grinding leather, or leather pulp obtained by grinding leather in damp condition with water, or the leather powder and the leather pulp.

Manufacturing method of the leather powder comprises steps of:

washing and denaturalizing the leather to a pH of neutrality, drying, grinding to a coin size, and grinding into wadding and powder shapes.

Manufacturing method of the leather pulp comprises steps of:

washing and denaturalizing the leather to a pH of neutrality, and grinding into leather pulp, wherein solid particles of the leather pulp has a size of 0.1-3.5 mm.

EXAMPLE 1

One or two member selected from the group consisting of leftover bits and pieces of cow leather and third split cow leather is washed and denaturalized to a pH of neutrality, dried, grinded to leather pieces having a coin size by a plastic grinder, and then grinded to leather powder in a wadding and powder shape with a machinery. The leftover bits and pieces are leather which is cut during process of trimming livestock leather after hair removal.

The leather powder is added with hot water (60° C.-90° C.) and stirred to form agglomerate, sent into a preset grid mould to tile, pressurized with a plate type pressurizer while being heated to 50° C.-55° C., formed, and dried to obtain artificial pet chewing leather having a smooth block shape, uniform thickness (common thickness of 0.8 mm-3.5 mm), and good surface fineness.

EXAMPLE 2

One or two member selected from the group consisting of leftover bits and pieces of cow leather and third split cow leather is washed and denaturalized to a pH of neutrality, in damp condition with water, grinded by a colloid mill into leather pulp with solid particles having a size of below 0.8 mm.

The leather pulp is removed water with a dehumidifier until water content thereof is 45~60%, sent into a preset grid mould to tile, pressurized, heated to 30° C.-45° C., formed, and sent to a drying room to dry, so as to obtain artificial pet chewing leather having a smooth block shape, uniform thickness (common thickness of 0.8 mm-3.5 mm), and a good surface fineness. The artificial pet chewing leather according to this example of the present invention is capable of completely replacing the conventional cow-leather chew and pig-leather chew.

EXAMPLE 3

The leather powder manufactured according to example 1 (with a mass percent of 60%) and the leather pulp manufactured according to the example 2 (with a mass percent of 40%) are mixed and stirred to form agglomerate, sent into a preset grid mould to tile, pressurized with a plate type pressurizer while being heated to 50° C.-55° C., formed, and dried to obtain artificial pet chewing leather having a smooth block shape, uniform thickness (common thickness of 0.8 mm-35 mm), and good surface fineness.

EXAMPLE 4

Leftover bits and pieces of cow leather is washed and denaturalized to a pH of neutrality, dried, grinded to leather pieces having a coin size by a plastic grinder, and then grinded to leather powder in a wadding and powder shape (looks like cotton fiber in appearance and contains long silk fiber and a small amount of powder) with a machinery. Leftover bits and pieces of cow leather and third split cow leather is washed and denaturalized to a pH of neutrality, in damp condition with water, grinded to leather pulp with solid particles having a size of 0.1 mm~3.5 mm. Skeleton of livestock bones are sent to boiled water to soak for 5 minutes, removed to a dry room for drying until water content thereof is 20~35% smoked, and then sent to dry room again for grinding into powder. 34% by weight of leather powder, 30% of leather pulp, 33% bird bone powder, 2% chicken bone flavor and 0.5~1.5% edible pigment which can be attractive red, chocolate brown, apple green and lemon yellow according to requirements are fully mixed and stirred to form agglomerate, pressed into various shapes by extruder or mould, sent to dry room for drying, and then packaged. Combinations of livestock bone powder, livestock meat powder, livestock meat paste and livestock leather overcome shortcomings that the conventional cow leather pet chew and pig leather pet chew have a light flavor, high waste; the pet chew with meat has a high cost, and eating bones alone is easy to stabbing and wounding animals. The artificial dog chew of the present invention satisfies tastes of pet dog and is easy to popularize.

EXAMPLE 5

Leftover bits and pieces of cow leather and third split cow leather is washed and denaturalized to a pH of neutrality, in damp condition with water, grinded by a colloid mill into leather pulp with solid particles having a size below 0.8 mm. Bird meat, pork or beef is dried and grinded into powder. 38% by weight of leather pulp, 50% meat powder, 10% starch or protein, 1.5% flavor (corresponding to types of meat powder), 0.5% edible pigment (with color according to requirements) are fully mixed and stirred to form agglomerate, and then pressed into various shapes by extruder or mould, sent to dry room and dried.

EXAMPLE 6

Leather pulp, meat powder (chicken), starch, flavor and edible pigment, which have the same weight ratios as example 5, are fully mixed and stirred to form agglomerate, sent into a preset grid mould to tile, pressurized with a plate type pressurizer while being heated to 50° C.~55° C., formed, and sent to dry room for drying to obtain cow-leather and chicken-meat artificial pet chewing leather, cut into leather bar, and then softened to mold by hand craft into pet chew products such as knotting bone and leather rolls. The advantage of the pet chew product lies in having chicken tastes and with half cost of chicken meat, and having characteristics of grinding teeth as cow leather pet chew.

EXAMPLE 7

Leftover bits and pieces of cow leather was washed and denaturalized to a pH of neutrality, dried, grinded to leather pieces having a coin size by a plastic grinder, and then grinded to leather powder in a wadding and powder shape with a machinery. Leftover bits and pieces of cow leather and third split cow leather is washed and denaturalized to a pH of neutrality, in damp condition with water, grinded to leather pulp with solid particles having a size of 0.1 mm~3.5 mm. Skeleton of livestock bones are sent to boiled water to soak for 5 minutes, removed to a dry room for drying until water content thereof is 20~35%, smoked, and then sent to dry room again for grinding into powder; chicken meat is dried and grinded into powder.

29% by weight of leather powder, 19% leather pulp, 25% bird bone powder, 25% chicken powder, 1.5% chicken bone flavor and 0.5% edible pigment are fully mixed and stirred to form agglomerate, pressed into various shapes by extruder or mould, sent to dry room and dried to obtain a new type pet chew with cow leather, chicken meat and chicken bone.

Advantages of this type pet chew lie in having tastes of chicken meat, with low cost, having effects of supplementing calcium and grinding teeth, satisfying tastes of pets and being waste free.

EXAMPLE 8

Leftover bits and pieces of cow leather is washed and denaturalized to a pH of neutrality, dried, grinded to leather pieces having a coin size by a plastic grinder, and then grinded to leather powder in a wadding and powder shape with a machinery. Leftover bits and pieces of cow leather and third split cow leather is washed and denaturalized to a pH of neutrality, in damp condition with water, grinded to leather pulp with solid particles having a size below 0.8 mm.

58% of the leather powder, 38% of the leather pulp and 4% edible glycerol are mixed and stirred to form agglomerate, sent into a preset grid mould to tile, pressurized with a plate type pressurizer while being heated to 50° C.-55° C., formed, and sent to dry room for drying to obtain artificial pet chewing leather having a smooth block shape, uniform thickness (common thickness of 0.8 mm-3.5 mm), with high uniformity and high softness. Products made by pet chew leather added with glycerol have a good protective effect on teeth of puppy and old dog.

EXAMPLE 9

Leftover bits and pieces of cow leather is washed and denaturalized to a pH of neutrality, in damp condition with water, grinded to leather pulp with solid particles having a size of 0.1 mm~3.5 mm, mixed with starch or protein to produce paste.

90% by weight ratio of the leather pulp and 10% of the paste are mixed and stirred to form soft agglomerate, then pressed with mould by hands to form shapes of bones or other shapes, sent to dry room for drying and then packaged.

EXAMPLE 10

Leftover bits and pieces of cow leather and third split cow leather is washed and denaturalized to a pH of neutrality, in damp condition with water, grinded to leather pulp with solid particles having a size of 0.1 mm~3.5 mm. Skeleton of livestock bones are sent to boiled water to soak for 5 minutes, removed to a dry room for drying until water content thereof is 20~35%, smoked, and then sent to dry room again for grinding into powder; bird meat is dried and grinded into powder.

30% by weight ratio of the leather pulp, 20% bird bone powder, 48% chicken paste and 2% chicken flavor are mixed and stirred to form a stuffing of pet chew.

The stuffing is covered by the artificial pet chewing leather as an external skin, made into products such as knotting bone, leather stick and hollow roll, dried to form a stuffed pet chew.

Advantages of the products lie in low cost, good taste, capable of attracting pets to eat over and with no remaining wasted, and capable of achieving functions of grinding teeth and strengthening body as well as conventional pet chew.

EXAMPLE 11

Leftover bits and pieces of cow leather and third split cow leather is washed and denaturalized to a pH of neutrality, in damp condition with water, grinded to leather pulp with solid particles having a size of 0.1 mm~3.5 mm. Skeleton of livestock bones are sent to boiled water to soak for 5 minutes, removed to a dry room for drying until water content thereof is 20~35%, smoked, and then sent to dry room again for grinding into powder; chicken meat is dried and grinded into powder.

30% by weight ratio of the leather pulp, 25% chicken bone powder, 43.5% chicken meat powder and 1.5% chicken flavor are mixed and stirred to form a stuffing of pet chew.

The artificial pet chewing leather manufactured according to example 2 is cut into a block leather sheet with a size of 3*5 cm or 4*6 cm, an inner layer (rough layer) thereof is coated with pulp of the stuffing, a second sheet of pet chewing leather is overlayed, pulp of the stuffing is coated thereon, and a third sheet of pet chewing leather is overlayed, in such a manner that a new type multilayer pet chew which is well arranged is formed.

An artificial pet chewing leather which is cut into a block shape (with sizes cut according to requirements) is softened, an inner layer thereof is coated with pulp of the stuffing, and made into new type product with various shapes by hand craft. Advantages of the products lie in low cost, good taste, capable of attracting pets to eat over and with no remaining wasted, and capable of achieving functions of grinding teeth and strengthening body as well as conventional pet chew.

EXAMPLE 12

Leftover bits and pieces of cow leather is washed and denaturalized to a pH of neutrality, dried, grinded to leather pieces having a coin size by a plastic grinder, and then grinded to leather powder in a wadding and powder shape with a machinery. Leftover bits and pieces of cow leather is washed and denaturalized to a pH of neutrality, in damp condition with water, grinded to leather pulp with solid particles having a size of 0.1 mm~3.5 mm.

50% by weight ratio of leather pulp and 50% of the leather pulp are mixed and stirred to form agglomerate, kneaded to produce a soft leather sheet with a block shape having a size of 3*5 cm or 4*6 cm and a thickness of 1.8-3.5 mm.

30% by weight ratio of the leather powder and 68% of chicken meat powder and 2% chicken meat flavor are mixed and stirred to form agglomerate, spread out into a thin sheet, cut into small blocks with a size as same as chicken cubes, dried to obtain dried chicken cubes. The soft leather sheet with the block shape produced in this example is sprinkled with the chicken cubes uniformly, pressed with a plate to be embedded in the leather sheet, and dried to obtain an embedded pet chew product.

Advantage of the product lies in that if pet dogs want to eat the chicken cubes, they must bite external leather at first, so as to achieve effects of eating out the products and grinding teeth and strengthening body.

The raw materials of the artificial pet chew leather according to the examples mentioned above are easily obtained and manufacturing process thereof is easy operating. The artificial pet chewing leather and pet chew products manufactured thereof can be utilized as pet diets. Pet dogs are respectively fed conventional cow leather pet chew, pig leather chew, leather chew with meat and the pet chew manufactured according to examples of the present invention which have same sizes, and the results are shown in Table 1. It can be seen from the Table 1 that the pet chew manufactured according to method of the present invention has high biting and chewing resistance, and are favorite diets of pets. Furthermore, calcium is also ingested by the pets while eating the pet chew.

TABLE 1

Feeding Results of the three types pet chew

| | Types of products | | |
|---|---|---|---|
| | conventional cow leather or pig leather pet chew | Pet chew with meat | Pet chew of the present invention |
| Chewing time | long | long | long |
| Cost | minimum | Maximum (2~3 times of the present invention) | low |
| Remnants after eating | Large amount | Small amount | No remnants |
| Likeability of pet dog | dislike | like | like |

The present application is not limited to the artificial pet chewing leather according to examples mentioned above, or pet chew made of the artificial pet chewing leather. Pet chew which utilizes raw materials of leather powder grinded by leather or leather pulp obtained by grinding leather in damp condition with water are all under protection of the present application.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An artificial pet chewing leather, wherein raw material thereof comprises:
   water and leather powder obtained by grinding leather;
   wherein manufacturing method of the leather powder comprises steps of:
   washing and denaturalizing the leather to a pH of neutrality,
   drying,
   grinding to a coin size, and
   grinding into wadding and powder shapes.

2. The artificial pet chewing leather, as recited in claim 1, wherein the leather is selected from the group consisting of whole leather, full-grain leather, second split leather, third split leather and leftover bits and pieces of livestock skin which is processed with hair removal and pending for tanning.

3. A method for manufacturing the artificial pet chewing leather, as recited in claim 1, comprising following steps of: mixing the raw materials mentioned above, and forming, wherein the forming is extrusion molding by extruder, molding by biscuit machine, press molding by mould or molding by hand craft.

4. An artificial pet chewing leather, wherein raw material thereof comprises:
   water and leather powder obtained by grinding leather, and leather pulp obtained by grinding leather in damp condition with water;
   wherein mass ratio of the leather powder and the leather pulp is 3~8:2~7.

5. The artificial pet chewing leather, as recited in claim 4, wherein the raw material further comprises livestock bone powder, livestock meat powder, livestock meat paste, starch, protein powder, glycerol, flavoring agents, edible pigment and trace elements.

6. The artificial pet chewing leather, as recited in claim 5, wherein an additive amount of the glycerol is 1~10% of a total weight of the pet chew.

7. The artificial pet chewing leather, as recited in claim 5, wherein an additive amount of the livestock meat powder or the livestock meat paste is 5~95% of the total weight of the pet chew.

8. The artificial pet chewing leather, as recited in claim 5, wherein an additive amount of the starch is 5~40% of a total weight of the pet chew.

9. The artificial pet chewing leather, as recited in claim 5, wherein mass ratio of the leather powder and the livestock bone powder is 2~9: 1~8.

10. The artificial pet chewing leather, as recited in claim 5, wherein the livestock bone powder is produced by drying, smoking and grinding livestock bone frame.

* * * * *